United States Patent Office 2,988,503
Patented June 13, 1961

2,988,503
PROCESS OF ADSORPTION
Robert M. Milton, Buffalo, and Donald W. Breck, Tonawanda, N.Y., assignors to Union Carbide Corporation, a corporation of New York
No Drawing. Filed July 25, 1956, Ser. No. 599,930
20 Claims. (Cl. 210—24)

This invention relates to a process for the adsorption of fluids. More particularly the invention relates to a process for the adsorption of fluids by molecular sieves.

Molecular sieves have a sorption area available on the inside of a large number of uniformly sized pores of molecular dimensions. With such an arrangement molecules of a certain size and shape enter the pores and are adsorbed while larger or differently shaped molecules are unable to enter the pores. Many adsorbents, for example, charcoal and silica gel, do not exhibit molecular sieve action relying upon other characteristics for their adsorbing powers. Molecular sieves adsorb relatively large quantities of materials and have a strong attraction for certain other molecules at low partial pressures rendering them particularly useful in the separation of small quantities of one fluid from another. Molecular sieves have also been found to be extremely useful at low temperatures.

It is the principal object of this invention to provide a process for the adsorption of certain fluids by a molecular sieve. It is a further object of this invention to provide a process for the preferential adsorption of certain fluids from mixtures thereof with other materials.

The objects of the invention are accomplished by providing a quantity of a particular molecular sieve and mixing with the molecular sieve a fluid capable of being adsorbed by the molecular sieve. The particular molecular sieve suitable for use in the process of the invention is a crystalline zeolite, or metal-aluminum-silicate, occurring in nature and known as faujasite.

The composition of faujasite can be represented as a mixture of the oxides of calcium, sodium, aluminum, and silicon. Typical samples that have been analyzed have the following compositions expressed in mole ratios of oxides present:

|  | I | II | III |
|---|---|---|---|
| calcium oxide | 0.54 | 0.51 | 0.41 |
| sodium oxide | 0.43 | 0.49 | 0.58 |
| aluminum oxide | 1.00 | 1.00 | 1.00 |
| silicon oxide | 5.00 | 4.65 | 4.54 |

The mole ratio of the sum of the calcium oxide and sodium oxide to alumina varies as follows:

$$\frac{CaO + Na_2O}{Al_2O_3} = 1.0 \pm 0.1$$

The mole ratio of silica to alumina lies within the following range:

$$\frac{SiO_2}{Al_2O_3} = 4.5 \text{ to } 5.0$$

The calcium and sodium ions in the faujasite can be exchanged for other positive ions or the proportions of one to the other altered by conventional ion exchange techniques. The preferred procedure is to pass a water solution of the ion to be added through a quantity of the faujasite. In this manner the desired amount of a particular ion can be exchanged for either the sodium or calcium ions or both. Cations having a valence of not more than three may be exchanged for the cations in the faujasite in the manner described. Neither the ratio of silica to alumina nor the amounts of these materials is altered by the ion exchange. In fact the silica and alumina amounts and ratios cannot be altered by any known means without destroying the crystal.

The ion exchanged forms of faujasite exhibit adsorption properties which differ from one to the other only in minor details. Faujasite, including the ion exchanged forms, may be represented by the formula:

$$1 \pm 0.1 M_{\frac{2}{n}} O : 1 Al_2O_3 : 4.75 \pm 0.25 SiO_2 : Y H_2 O$$

In the above formula "M" is one or a number of cations having a valence of not more than three and "$n$" is the valence state of the cation. Y may be any value up to about 8.

Before faujasite may be used in the process of the invention at least a part of its adsorbed water must be removed. This can be done by heating the faujasite to drive off the water. Heating the faujasite to temperatures of about 250° C. has given excellent results. Faujasite can be dehydrated by heating without destroying the crystal structure.

Dehydrated faujasite will accept or adsorb molecules having a maximum dimension of the minimum projected cross-section that is smaller than that of heptacosafluorotributylamine $(C_4F_9)_3N$. Thus one of the prime uses of the process of the invention is to separate the larger molecules from smaller ones. The data in Table A show the extent to which faujasite will adsorb certain smaller molecules. The ability of faujasite to adsorb molecules at low temperatures and pressures is also shown by the data. Faujasite exhibits a strong preference for polar over non-polar compounds and is useful in the separation of one from the other. The faujasite used in collecting the data in the table was activated or dehydrated by heating the faujasite under vacuum at 250° C. The term "Weight percent" refers to the percentage increase in the weight of the faujasite. The pressure listed is the partial pressure of the adsorbate.

*Table A*

| Adsorbate | Temp., °C. | Pressure, mm. Hg | Weight Percent |
|---|---|---|---|
| Propane | 25 | 10 | 2.9 |
|  |  | 52 | 7.2 |
|  |  | 168 | 9.3 |
| Butene-1 | 25 | 0.45 | 7.7 |
|  |  | 3 | 12.1 |
|  |  | 156 | 17.0 |
| Argon | −196 | 0.092 | 20.0 |
|  |  | 0.4 | 27.7 |
|  |  | 9 | 31.9 |
| Isobutane | 25 | 10 | 8.7 |
|  |  | 743 | 12.9 |
| Cyclohexane | 25 | 0.060 | 10.6 |
|  |  | 10 | 16.5 |
|  |  | 92 | 17.0 |
| Benzene | 25 | 0.045 | 7.2 |
|  |  | 0.072 | 14.3 |
|  |  | 0.34 | 18.3 |
|  |  | 85 | 23.0 |
| M-Xylene | 25 | 0.02 | 5.4 |
|  |  | 1.6 | 16.4 |
|  |  | 8 | 18.9 |
| P-Xylene | 25 | 0.06 | 10.6 |
|  |  | 2.2 | 17.2 |
|  |  | 6.7 | 19.7 |
| Krypton | −183 | 0.005 | 11.1 |
|  |  | 0.01 | 24.0 |
|  |  | 0.025 | 43.6 |
|  |  | 0.14 | 50.0 |
| Carbon dioxide | 25 | 43 | 3.5 |
|  |  | 305 | 10.4 |
|  |  | 708 | 14.6 |
| Water | 25 | 0.007 | 10.1 |
|  |  | 0.09 | 17.2 |
|  |  | 1 | 25.9 |
|  |  | 23 | 33.4 |
| Oxygen | −196 | 0.033 | 13.9 |
|  |  | 0.19 | 23.2 |
|  |  | 121 | 29.3 |
| Nitrogen | −196 | 0.010 | 13.7 |
|  |  | 0.045 | 17.9 |
|  |  | 310 | 23.6 |
| N-Pentane | 25 | 0.3 | 8.9 |
|  |  | 1.4 | 12.1 |
|  |  | 404 | 14.9 |

Water, as shown by the data in Table A, can be separated from a number of materials by using faujasite which has been at least partially dehydrated in accordance with the process of the invention. Water may be separated from mixtures of water and less polar molecules. Water may be separated from aromatic hydrocarbons, for example benzene, m-xylene and p-xylene. Water may also be separated from carbon dioxide, from aliphatic hydrocarbons, for example propane, isobutane, n-pentane, and cyclohexane, and from olefins, for example butene-1.

The process of the invention is also useful in separating aromatic hydrocarbons from aliphatic hydrocarbons. Examples of this use of the process are the separation of either benzene, m-xylene or p-xylene from either propane, isobutane, n-pentane or cyclohexane.

Unsaturated hydrocarbons may be separated from saturated hydrocarbons. For example butene-1 may be separated from mixtures of butene-1 and either isobutane or propane.

The separations mentioned above as well as others possible according to the process of the invention are accomplished by mixing at least partially dehydrated faujasite with the mixture to be separated and effecting the preferential adsorption of one of the materials with faujasite. The data in Table A indicates in general the nature and magnitude of the preference which will be exhibited in the process by the faujasite.

The faujasite may be used in the process of the invention in any suitable form, for example, as a freely flowing powder or as massive crystals.

This application is in part a continuation of United States patent application Serial No. 400,391, filed December 24, 1953, now abandoned.

What is claimed is:

1. In a process for separating molecules having maximum dimensions of their minimum projected cross-sections larger than that of heptacosafluorotributyl amine from a mixture thereof with molecules having such a dimension smaller than that of heptacosafluorotributyl amine, the improvement comprising mixing said mixture of molecules with at least partially dehydrated faujasite, and adsorbing with said faujasite at least a portion of said molecules having said smaller dimension from said mixture.

2. In a process for separating polar compounds having maximum dimensions of their minimum projected cross-sections smaller than that of heptacosafluorotributyl amine from non-polar compounds, the improvement comprising providing a mixture of polar and non-polar compounds, intimately associating said compounds with at least partially dehydrated faujasite, and preferentially adsorbing with said faujasite at least a portion of said polar molecules from said mixture.

3. In a process for separating water from less polar compounds, the improvement comprising providing a mixture of water and a less polar compound, intimately associating said mixture with at least partially dehydrated faujasite, and preferentially adsorbing with said faujasite at least a portion of said water from said mixture.

4. In a process for separating water from aromatic hydrocarbons, the improvement comprising providing a mixture of water and an aromatic hydrocarbon, intimately associating said mixture with at least partially dehydrated faujasite, and preferentially adsorbing with said faujasite at least a portion of said water from said mixture.

5. In a process for separating water from benzene, the improvement comprising providing a mixture of water and benzene, intimately associating said mixture with at least partially dehydrated faujasite, and preferentially adsorbing with said faujasite at least a portion of said water from said mixture.

6. In a process for separating water from m-xylene, the improvement comprising providing a mixture of water and m-xylene, intimately associating said mixture with at least partially dehydrated faujasite, and preferentially adsorbing with said faujasite at least a portion of said water from said mixture.

7. In a process for separating water from p-xylene, the improvement comprising providing a mixture of water and p-xylene, intimately associating said mixture with at least partially dehydrated faujasite, and preferentially adsorbing with said faujasite at least a portion of said water from said mixture.

8. In a process for separating water from aliphatic hydrocarbons, the improvement comprising providing a mixture of water and an aliphatic hydrocarbon, intimately associating said mixture with at least partially dehydrated faujasite, and preferentially adsorbing with said faujasite at least a portion of said water from said mixture.

9. In a process for separating water from propane, the improvement comprising providing a mixture of water and propane, intimately associating said mixture with at least partially dehydrated faujasite, and preferentially adsorbing with said faujasite at least a portion of said water from said mixture.

10. In a process for separating water from isobutane, the improvement comprising providing a mixture of water and isobutane, intimately associating said mixture with at least partially dehydrated faujasite, and preferentially adsorbing with said faujasite at least a portion of said water from said mixture.

11. In a process for separating water from n-pentane, the improvement comprising providing a mixture of water and n-pentane, intimately associating said mixture with at least partially dehydrated faujasite, and preferentially adsorbing with said faujasite at least a portion of said water from said mixture.

12. In a process for separating water from cyclohexane, the improvement comprising providing a mixture of water and cyclohexane, intimately associating said mixture with at least partially dehydrated faujasite, and preferentially adsorbing with said faujasite at least a portion of said water from said mixture.

13. In a process for separating water from olefins, the improvement comprising providing a mixture of water and an olefin, intimately associating said mixture with at least partially dehydrated faujasite, and preferentially adsorbing with said faujasite at least a portion of said water from said mixture.

14. In a process for separating water from butene-1, the improvement comprising providing a mixture of water and butene-1, intimately associating said mixture with at least partially dehydrated faujasite, and preferentially adsorbing with said faujasite at least a portion of said water from said mixture.

15. In a process for separating water from carbon dioxide, the improvement comprising providing a mixture of water and carbon dioxide, intimately associating said mixture with at least partially dehydrated faujasite, and preferentially adsorbing with said faujasite at least a portion of said water from said mixture.

16. In a process for separating aromatic hydrocarbons from aliphatic hydrocarbons, the improvement comprising providing a mixture of an aromatic hydrocarbon and an aliphatic hydrocarbon, intimately associating said mixture with at least partially dehydrated faujasite, and preferentially adsorbing with said faujasite at least a portion of said aromatic hydrocarbon from said mixture.

17. In a process for separating at least one of the aromatic hydrocarbons in the group consisting of benzene, m-xylene and p-xylene, from at least one of the aliphatic hydrocarbons in the group consisting of propane, isobutane, n-pentane, and cyclohexane, the improvement comprising providing a mixture of at least one of said aromatic hydrocarbons and at least one of said aliphatic hydrocarbons, intimately associating said mixture with at least partially dehydrated faujasite, and preferentially adsorbing with said faujasite at least a portion of said aromatic hydrocarbon from said mixture.

18. In a process for separating unsaturated hydrocarbons from saturated hydrocarbons, the improvement comprising providing a mixture of an unsaturated hydrocarbon and a saturated hydrocarbon, intimately associating said mixture with at least partially dehydrated faujasite, and preferentially adsorbing with said faujasite at least a portion of said unsaturated hydrocarbon from said mixture.

19. In a process for separating butene-1 from at least one of the saturated hydrocarbons in the group consisting of isobutane and propane, the improvement comprising providing a mixture of butene-1 and at least one of said saturated hydrocarbons, intimately associating said mixture with at least partially dehydrated faujasite, and preferentially adsorbing with said faujasite at least a portion of said butene-1 from said mixture.

20. A process for adsorbing a molecule having a maximum dimension of its minimum projected cross-section larger than that of water and having such a dimension smaller than that of heptacosafluorotributylamine which process comprises activating crystals of faujasite and mixing said molecule to be adsorbed with the activated faujasite crystals and adsorbing said molecules with said activated faujasite.

References Cited in the file of this patent

UNITED STATES PATENTS

| | | |
|---|---|---|
| 1,840,164 | Hirt | Jan. 5, 1932 |
| 2,407,180 | Schiller | Sept. 3, 1946 |
| 2,467,215 | McCarter | Apr. 12, 1949 |
| 2,717,696 | Schubert | Sept. 13, 1955 |

OTHER REFERENCES

Barrer: Journal Society of Chemistry Industry, vol. 64, pages 130–135, 1945.

Webster's New International Dictionary, page 924, 2nd Ed., 1940.

Barrer: "Sorption by Gmelinite and Mordenite," Trans. Faraday Soc., vol. 40, 1944, pages 555–562.